United States Patent
Pietrek (10) Patent No.: US 8,261,244 B2
(45) Date of Patent: Sep. 4, 2012

(54) ARBITRARY RUNTIME FUNCTION CALL TRACING

(75) Inventor: Paul M. Pietrek, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1607 days.

(21) Appl. No.: 11/422,030

(22) Filed: Jun. 2, 2006

(65) Prior Publication Data
US 2007/0283331 A1 Dec. 6, 2007

(51) Int. Cl.
G06F 9/44 (2006.01)
(52) U.S. Cl. .......................... 717/130; 717/128
(58) Field of Classification Search .............. 717/128, 717/130
See application file for complete search history.

(56) References Cited

U.S. PATENT DOCUMENTS

| | | | |
|---|---|---|---|
| 5,970,245 A | 10/1999 | Poteat et al. | |
| 5,970,246 A | 10/1999 | Moughani et al. | |
| 6,108,715 A * | 8/2000 | Leach et al. | 719/330 |
| 6,263,491 B1 * | 7/2001 | Hunt | 717/130 |
| 6,338,159 B1 | 1/2002 | Alexander, III et al. | |
| 6,643,842 B2 | 11/2003 | Angel et al. | |
| 6,738,965 B1 | 5/2004 | Webster | |
| 6,910,206 B1 | 6/2005 | Nevill | |
| 6,931,632 B2 | 8/2005 | Ramasamy et al. | |
| 2001/0042058 A1 | 11/2001 | Harrington et al. | |
| 2002/0129229 A1 | 9/2002 | Cornaby et al. | |
| 2004/0163077 A1 * | 8/2004 | Dimpsey et al. | 717/130 |
| 2005/0108562 A1 * | 5/2005 | Khazan et al. | 713/200 |

FOREIGN PATENT DOCUMENTS
GB 2417579 1/2006

OTHER PUBLICATIONS

Randall Hyde, "3.8 Parameters", Apr. 27, 2004, http://web.archive.org/web/20040427195604/http://webster.cs.ucr.ed u/AoA/Windows/HTML/IntermediateProceduresa3.html.*

Markus Hof, "Just-In-Time Stub Generation", 1997, Lecture Notes in Computer Science, vol. 1204, Proceedings of the Joint Modular Languages Conference on Modular Programming Languages, pp. 197-206.*

Robert H. B. Netzer and Mark H. Weaver; Optimal Tracing and Incremental Reexecution for Debugging Long-Running Programs; Dept. of Computer Science ; Brown University, Box 1910, Providence, RI 02912; Copyright 1994 ACM http://delivery.acm.org/10.1145/180000/178477/p313-netzer.pdf?key1=178477&key2=5865003411&coll=GUIDE&dl=GUIDE&CFID=67810615&CFTOKEN=1844570.

Tom Boyd and Partha Dasgupta; Injecting Distributed Capabilities Into Legacy Applications Through Cloning and Virtualization; Tempe, AZ; http://www.public.asu.edu/~tboyd/publications/pdpta2000.pdf.

L. Mummert and M. Satyanarayanan; Long Term Disbributed File Reference Tracing: Implementation and Experience; School of Computer Science, Carnegie Mellon University, Pittsburgh, PA 15213; Nov. 1994. http://ssrc.cse.ucsc.edu/projects/DFSTrace/DFSTrace.pdf.

Galen Hunt and Doug Brubacher; Detours: Binary Interception of Win32 Functions; MSR; One Microsoft Way, Redmond, WA 98052; Jul. 1999.

* cited by examiner

Primary Examiner — Wei Zhen
Assistant Examiner — Lanny Ung (57) ABSTRACT

A target function is identified during runtime. Instrumentation is applied to the target function during runtime that includes determining target function information associated with the target function, wherein the target function information includes a call signature of the target function. The target function is executed.

18 Claims, 11 Drawing Sheets

ARBITRARY RUNTIME FUNCTION CALL TRACING

BACKGROUND

Software developers often use monitoring tools to trace and analyze code. Instrumentation may be used to monitor calls to a particular function, referred to as a target function, and to perform operations such as logging the values of the function's arguments. Instrumentation may be inserted into target functions before program execution or may be inserted during runtime of a program that uses the target functions.

Runtime instrumentation involves intercepting functions during program execution and inserting instrumentation into the binary code. One technique is to directly modify the target function's code so that control goes to an instrumentation tool specified location. However, such techniques may require that the instrumentation tool have prior knowledge of target function information, such as the call signature.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide intercepting functions during runtime for tracing without any prior knowledge of what functions will be traced. An instrumentation manager may intercept target functions with any possible call signature and access the functions' parameter values during runtime. Once the call signature of a target function is determined, a common entry point module may perform trace preprocessing of the target function. Also, when the target function returns, execution is redirected to a common return point module to perform trace postprocessing before returning to the original caller.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
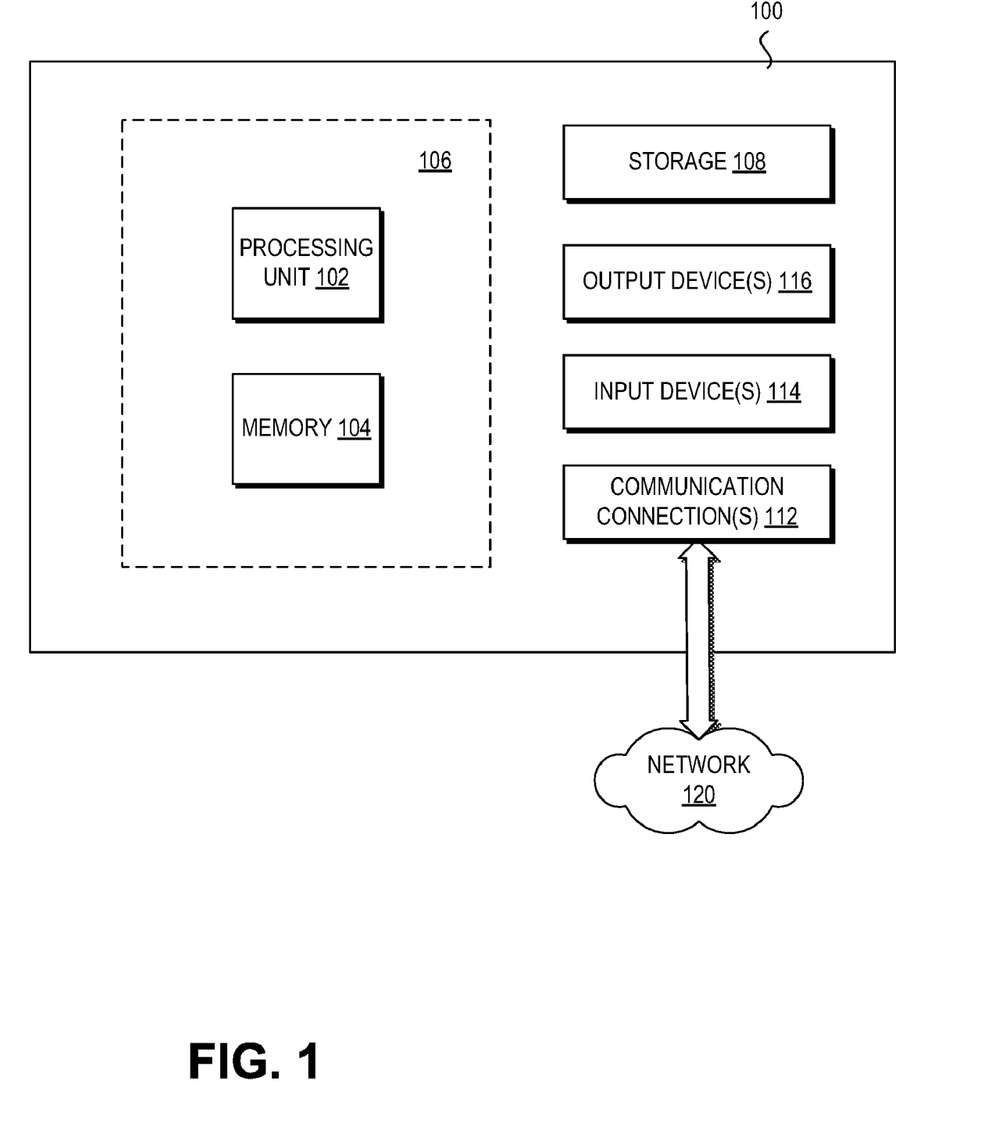
FIG. 1 is a block diagram of an example operating environment to implement embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing systems, environments, and/or configurations that may be suitable for use with embodiments described herein including, but not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, embodiments of the invention will be described in the general context of "computer readable instructions" being executed by one or more computers or other computing devices. Computer readable instructions may be distributed via computer readable media (discussed below). Computer readable instructions may be implemented as program modules, such as functions, objects, application program interfaces, data structures, and the like, that perform particular tasks or implement particular abstract data types. Typically, the functionality of the computer readable instructions may be combined or distributed as desired in various environments.

FIG. 1 shows an exemplary system for implementing one or more embodiments of the invention in a computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes both computer storage media and communication media. Computer storage media includes volatile and non-volatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as with other computing devices through network 120. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Those skilled in the art will realize that storage devices utilized to store computer readable instructions may be distributed across a network. For example, a remote computer accessible via network 120 may store computer readable instructions to implement one or more embodiments of the invention. A local or terminal computer may access the remote computer and download a part or all of the computer readable instructions for execution. Alternatively, the local computer may download pieces of the computer readable instructions as needed, or distributively process by executing some instructions at the local terminal and some at the remote computer (or computer network). Those skilled in the art will also realize that by utilizing conventional techniques known to those skilled in the art that all, or a portion of the computer readable instructions may be carried out by a dedicated circuit, such as a Digital Signal Processor (DSP), programmable logic array, and the like.

Figure 2:
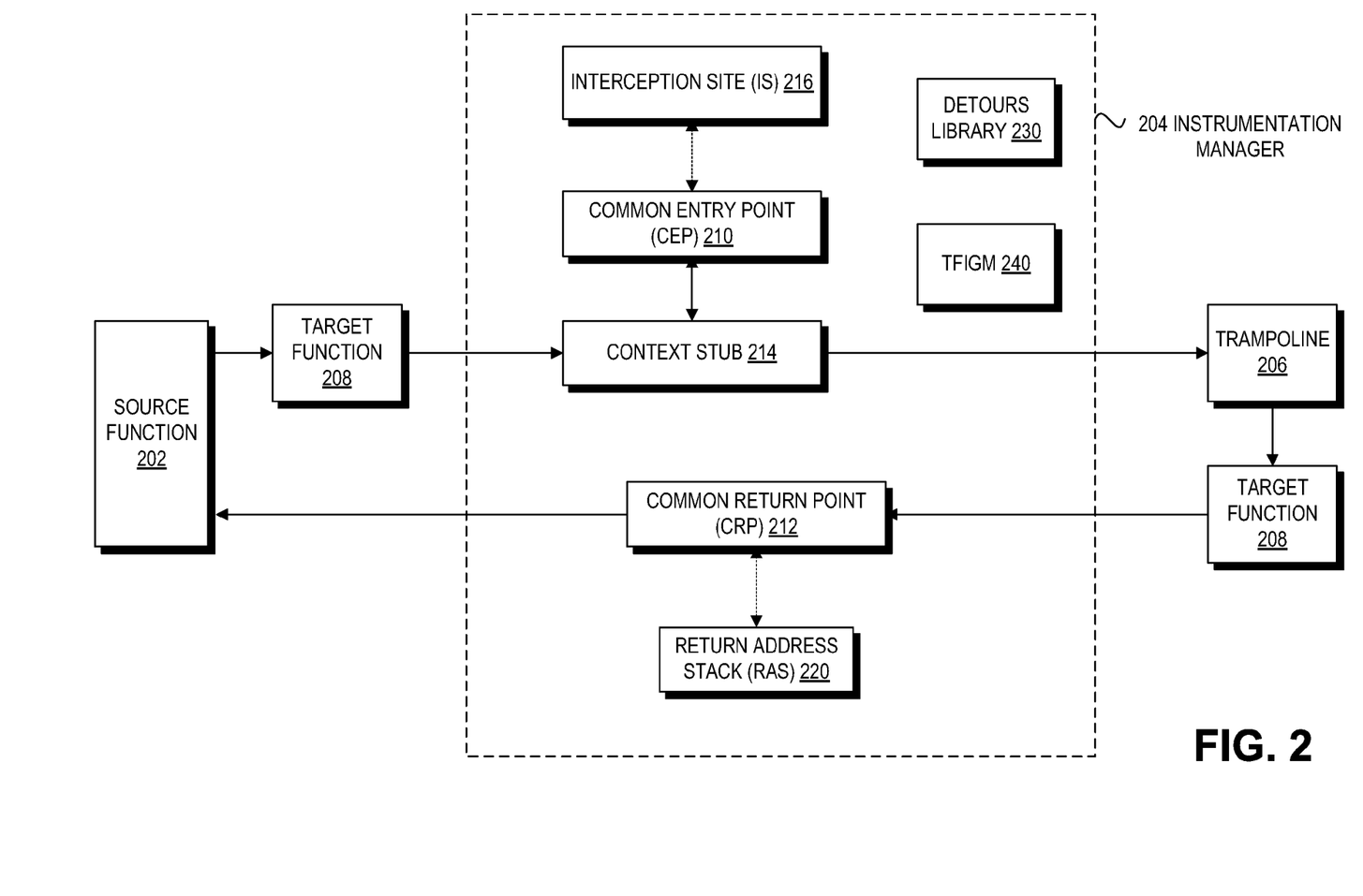
FIG. 2 is a block diagram of execution flow of a target function after instrumentation in accordance with an embodiment of the invention.
Figure 3A:
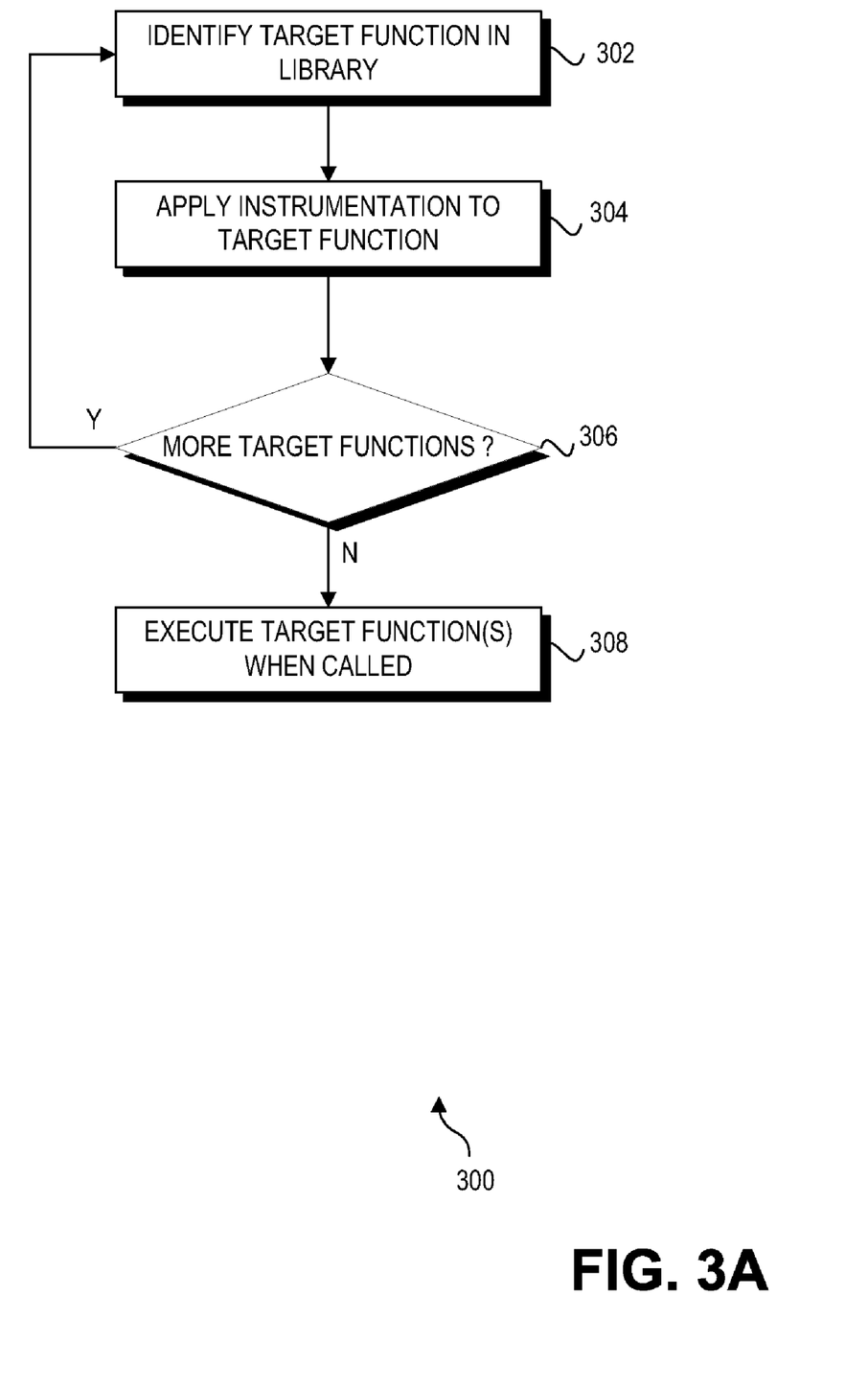
FIG. 3A is a flowchart showing the logic and operations of target function instrumentation and execution in accordance with an embodiment of the invention.
Figure 3B:
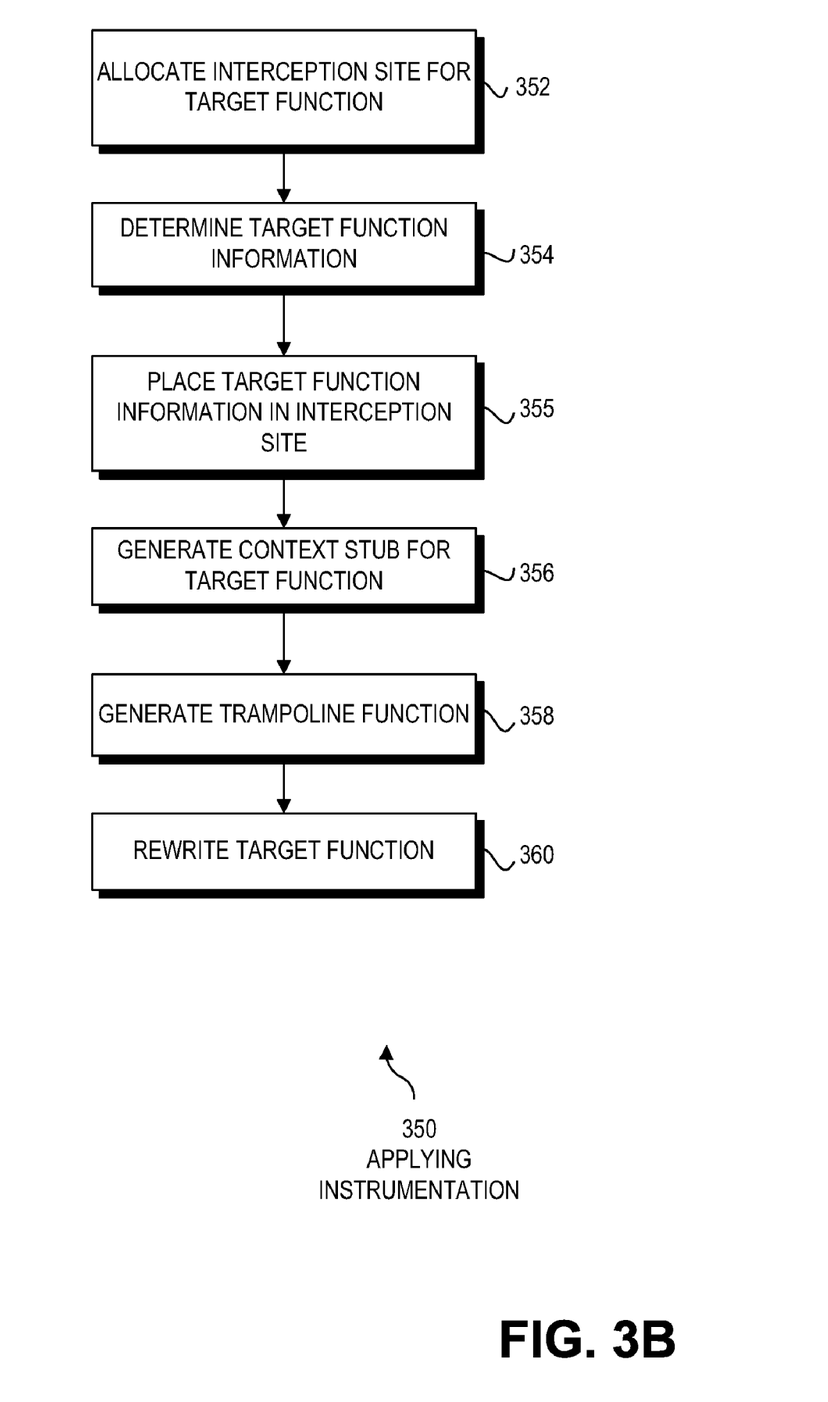
FIG. 3B is a flowchart showing the logic and operations of applying instrumentation in accordance with an embodiment of the invention.

Turning to FIGS. 2, 3A and 3B, instrumentation by an Instrumentation Manager (IM) 204 in accordance with embodiments of the invention will be discussed. IM 204 inserts instrumentation code in target function 208 at runtime. Among other things, IM 204 determines the call signature of target function 208 at runtime. This enables instrumentation to be applied to any target function without prior knowledge of the target function parameters.

As used herein, a call signature may include one or more of the order of the function parameters, the number of parameters, the types of parameters, such as integer, floating point number, string, and the like. The call signature may also include the function's return type. Also, as used herein, a function includes a method, an application program interface, a procedure, a subroutine, and the like.

In one embodiment, the instrumentation is applied when a library is loaded at runtime. Runtime includes the period of time from program load to program exit. During program runtime, a program, such as an application, may load a library that includes functions for use by the program. Thus, target function code may be modified in memory and not on disk. This enables functions to be intercepted during one execution of an application, but not intercepted on a subsequent execution of the application. While embodiments herein discuss intercepting Win32 binary functions on x86 machines, it will be appreciated that alternative embodiments may include instrumentation of other instruction sets and other system architectures.

In FIG. 3A, a flowchart 300 shows the logic and operations of instrumenting target functions and executing target functions in accordance with embodiments of the invention. Flowchart 300 includes two phases. First, instrumentation is applied to functions identified for targeting when a library, such as a dynamic linked library (DLL), is loaded at runtime. Second, the instrumentation of a particular target function is executed when that target function is called at runtime.

Starting in block 302, a targeted function is identified. In one embodiment, a developer may create a collection profile that contains a list of functions to target for instrumentation. This list may be automatically generated based on heuristics (e.g., monitor database related functions) or the developer may manually identify particular functions to target. In one embodiment, IM 204 identifies the functions tagged for instrumentation in a library.

Continuing to block 304, instrumentation is applied to the target function. Applying instrumentation may include changing code in the target function itself as well as generating new code and data structures associated with the target function. In one embodiment, IM 204 replaces the first few instructions of target function 208 with an unconditional jump to a piece of code, referred to as a context stub 214, created by IM 204 at runtime. IM 204 also determines target function information, such as the call signature, and places this information in interception site 216 for later use by tracing code.

The initial instructions replaced in target function 208 are preserved in a trampoline function 206. Trampoline function 206 includes the instructions removed from target function 208 and an unconditional jump to the remainder of target function 208. An embodiment of applying instrumentation to a target function is discussed below in connection with FIG. 3B.

After block 304 in flowchart 300, the logic continues to decision block 306 to determine if there are more functions targeted for instrumentation. If the answer is yes, then flowchart 300 returns to block 302 to instrument another target function. If the answer is no, then the logic proceeds to block 308.

In block 308, the one or more target functions are executed when called. FIG. 2 shows an embodiment of execution flow when target function 208 is called. Source function 202 calls target function 208. Execution proceeds to target function 208 and then jumps to context stub 214. Context stub 214 performs various stack related operations (discussed below) and then calls a common entry point (CEP) 210.

Common entry point 210 performs trace preprocessing using information in interception site 216. Trace preprocessing may include logging of registers values, stack values, and other tasks common to call tracing. Execution then returns to context stub 214 for stack cleanup operations (discussed below) and then jumps to trampoline 206 followed by target function 208.

Context stub 214 calls common entry point (CEP) 210 for target method trace preprocessing. A parameter passed to CEP 210 may be a pointer to interception site 216 for the target function. Thus, a single CEP 210 may be used for each target function. Conventionally, a developer must write a trace function for each target function so that the trace function has the necessary call signature of the target function. By determining the call signature of a target function at runtime, a developer may use a single tracing code module, such as CEP 210, and pass the call signature of the target method to CEP 210 as a pointer.

When target function 208 returns, target function 208 jumps to a modified return address on the stack (discussed below). The modified return address points to common return point (CRP) 212 for trace postprocessing of target function 208. Trace postprocessing may include logging various register and parameters values as well as other operations common to trace postprocessing. Information from interception site 216 may be used in postprocessing by CRP 212. Execution then continues to the original return address, shown as a jump from CRP 212 to source function 202.

In one embodiment, a per thread-data structure may be used in handling returns from nested target functions. An embodiment of such a data structure is shown as a return address stack (RAS) 220. An entry of return address stack 220 includes a pointer to the interception site for the target function and the original return address. Managing nested target function returns will be discussed below in connection with FIG. 9.

In one embodiment, IM 204 may be considered a set of routines that provide a wrapper around a Detours library 230 from the Microsoft Corporation. Detours library 230 enables instrumentation of Win32 functions on x86 machines. Detours may rewrite target function binary images using trampolines as discussed above. Detours logically preserve the un-instrumented target function (callable through a trampoline) as a subroutine for use by the instrumentation. In one embodiment, Detours library 230 copies instructions from the target function to the trampoline function until 5 bytes have been copied.

However, Detours requires the developer to know the target function's call signature in advance of the instrumentation. The detour function for a particular target function must have the same call signature as the target function. Thus, the developer must write detour functions for each function to be intercepted. Using embodiments herein, a target function's call signature is discovered at runtime automatically. Plus, target functions are diverted to a single common entry point (that is, a single detour function) instead of having to provide a detour function for each target function.

Turning to FIG. 3B, an embodiment of applying instrumentation to a target function is shown in a flowchart 350. Starting in block 352, IM 204 allocates an interception site for the target function information. An interception site is allocated for each target function to store target function information. In one embodiment, memory is allocated for an interception site.

Next, in block 354, target function information for the target function is determined. Such target function information includes its name, call signature, the trampoline address, and the like. In one embodiment, target function information is generated by a target function information generation module (TFIGM) 240 of IM 204. In one embodiment, TFIGM 204 reads native debug symbol tables and managed metadata associated with the target function, and emits a binary representation referred to herein as target function information. As discussed below, this target function information may be in a metainfo format.

Proceeding to a block 355, the target function information is placed in the target function's interception site. Placing target function information in the interception site may include placing the target function information itself in the IS or a pointer to the target function information is placed in the IS.

In one embodiment, target function information is maintained in a metainfo data format. Metainfo is a data format that represents information about executable code. Such information includes a function's call signature, function name, return type, and other characteristics. Such information may also include function variables names, function locations for native code, parameter and local variable locations, source file and line numbers, and user defined types (UDTs) and their members. In one embodiment, metainfo is implemented as a runtime loaded binary data format.

In one embodiment, metainfo data may be read, such as by common entry point 210, using only basic kernel32 Application Program Interface (API) calls and has no external code dependencies, such as a debug symbol table or managed metadata reading code. The metainfo representation of function and parameter types shares essentially the same format for native and managed code. By having a common native/managed representation, consumers of metainfo do not need to care about how a function was implemented.

In one embodiment, the metainfo format is table and index oriented. At the beginning of each metainfo file is a header. This header contains information such as target machine type, module date and time, and location and size of each table and pool that follows. In one embodiment, a metainfo table is an array of C++ structures. Tables include native methods, managed functions, parameters, UDTs, UDT data members, strings, and signature blobs. Variable length data such as strings and signature blobs may be kept in dedicated pools, and accessed via index values.

Figure 3C:
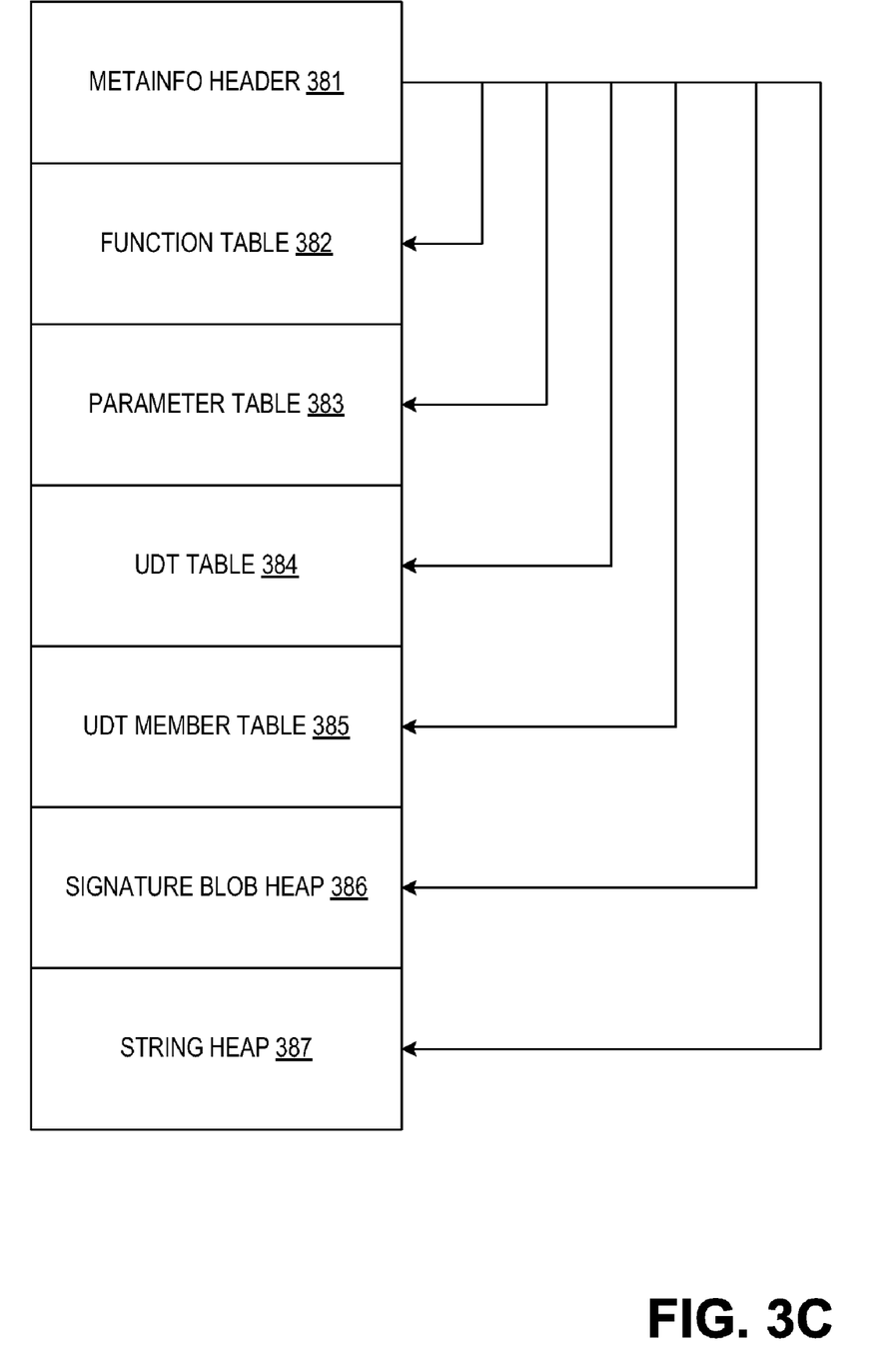
FIG. 3C is a block diagram of a metainfo format in accordance with an embodiment of the invention.

An embodiment of a metainfo format is shown in FIG. 3C. A metainfo header 381 indexes various target function information. This information may include a function table 382, a parameter table 383, a UDT table 384, a UDT member table 385, a signature blob heap 386, and a string heap 387.

After block 355, the logic of flowchart 350 proceeds to block 356 to generate a context stub for the target function. A context stub is a small stub of executable code dynamically created at runtime for each target function. Embodiments of operations of a context stub are discussed below in connection with FIG. 4.

Flowchart 350 then continues to block 358 where the trampoline function is generated for the target function and then to block 360 where the target function is rewritten to immediately jump to the target function's context stub when called.

Figure 4:
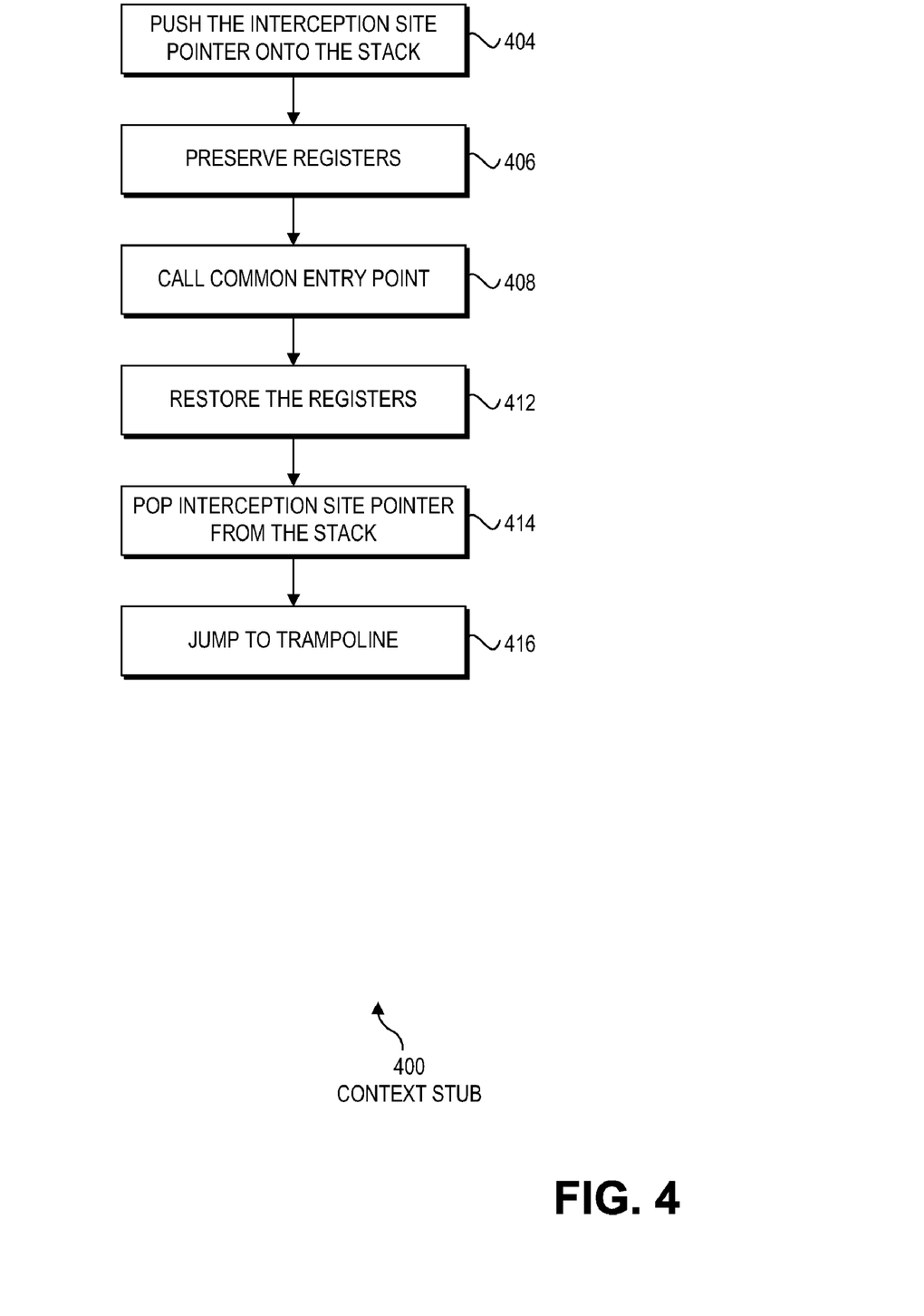
FIG. 4 is a flowchart showing the logic and operations of a context stub in accordance with an embodiment of the invention.

Turning to FIG. 4, a flowchart 400 shows an embodiment of the logic and operations of context stub 214 at execution of target function 208. In one embodiment, the context stub is a small stub of executable code created and initialized by IM 204.

Starting in block 404, an interception site pointer is pushed on the stack as a parameter. Next, in block 406, register contents are preserved. In one embodiment, registers contents are pushed onto the stack. In one embodiment, the registers include the general purpose registers of the processor executing the target function. In one embodiment, the stack refers to the processor thread stack associated with the processor executing the target function. Block 406 preserves the values of the registers for later restoring of the registers to their previous values. By preserving the registers and restoring them later, IM 204 may minimize its side effects on the system to provide more accurate monitoring of system behavior.

Next, in block 408, the common entry point is called. In one embodiment, the interception site pointer is passed to the common entry point as an argument. Thus, the common entry point can retrieve the target function information from the interception site as needed.

After returning from the common entry point, the logic continues to block 412 to restore the registers using the preserved register contents. Restoring the registers may include popping the register contents from the stack. Proceeding to block 414, the interception site pointer is popped from the stack. Thus, the stack and the registers have been restored to their condition prior to tracing activity. Next, in block 416, the logic jumps to trampoline function 206 and then to the first unmodified instruction of target method 208.

Figure 5:
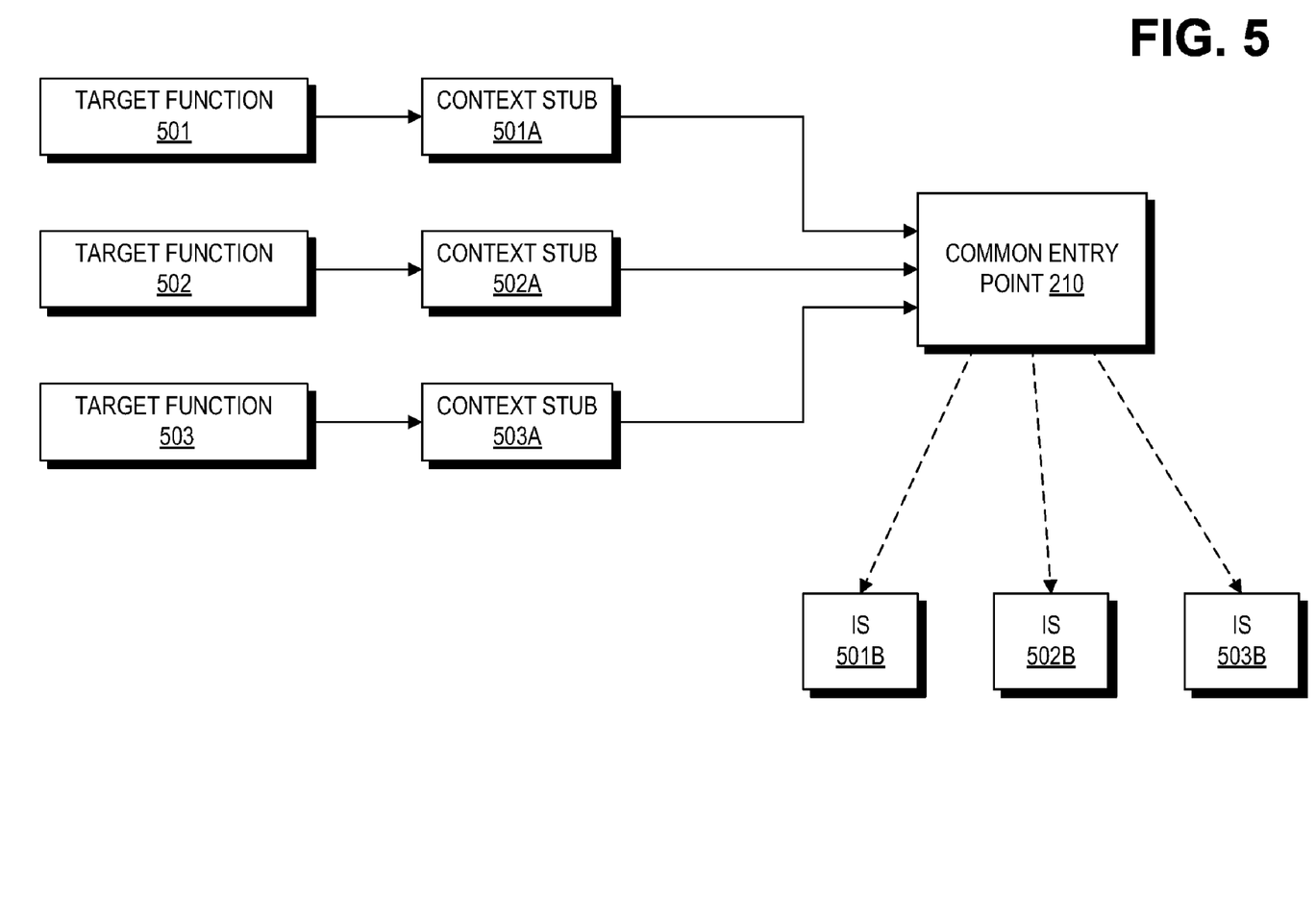
FIG. 5 is a block diagram of execution flow of target functions after instrumentation in accordance with an embodiment of the invention.

Turning to FIG. 5, an embodiment of operations of instrumentation manager 204 are shown for three target functions 501, 502, and 503. In FIG. 5, the execution of each target function jumps to its associated context stub 501A, 502A, and 503A, respectively. FIG. 5 also shows interceptions sites 501B, 502B, and 503B that were generated for target functions, 501, 502, and 503, respectively. Common entry point 210 may access interception sites 501B, 502B, and 503B as needed when performing trace preprocessing. Similarly, common return point 212 may access interception sites 501B, 502B, and 503B, as needed for trace postprocessing.

Figure 6A:
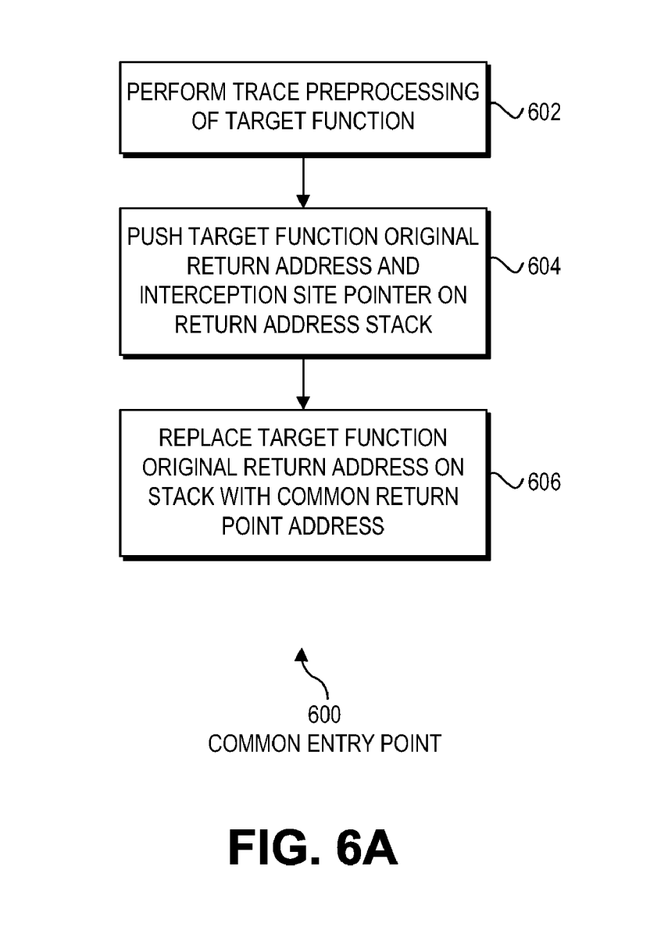
FIG. 6A is a flowchart showing the logic and operations of a common entry point in accordance with an embodiment of the invention.

Turning to FIG. 6A, a flowchart 600 shows one embodiment of the logic and operation of common entry point 210. Starting in a block 602, trace preprocessing of the target function is performed. The tracing code in common entry point 210 may utilize the target function's interception site information and the target function parameter data that is available on the stack. A typical trace logging scenario would use the interception site information to enumerate through each parameter of the target method. As each parameter is encountered, the location of the parameter value on the stack is determined. The parameter value is then available to the tracing code to take action as desired.

The target function parameters may be retrieved from the stack. When the target function is called during execution, the parameters passed by the calling function (for example, source function 202) may be passed on the stack or in registers. Since register contents are preserved on the stack (for example, as discussed above in connection with block 406), parameters passed via registers are also available on the stack.

Figure 6B:
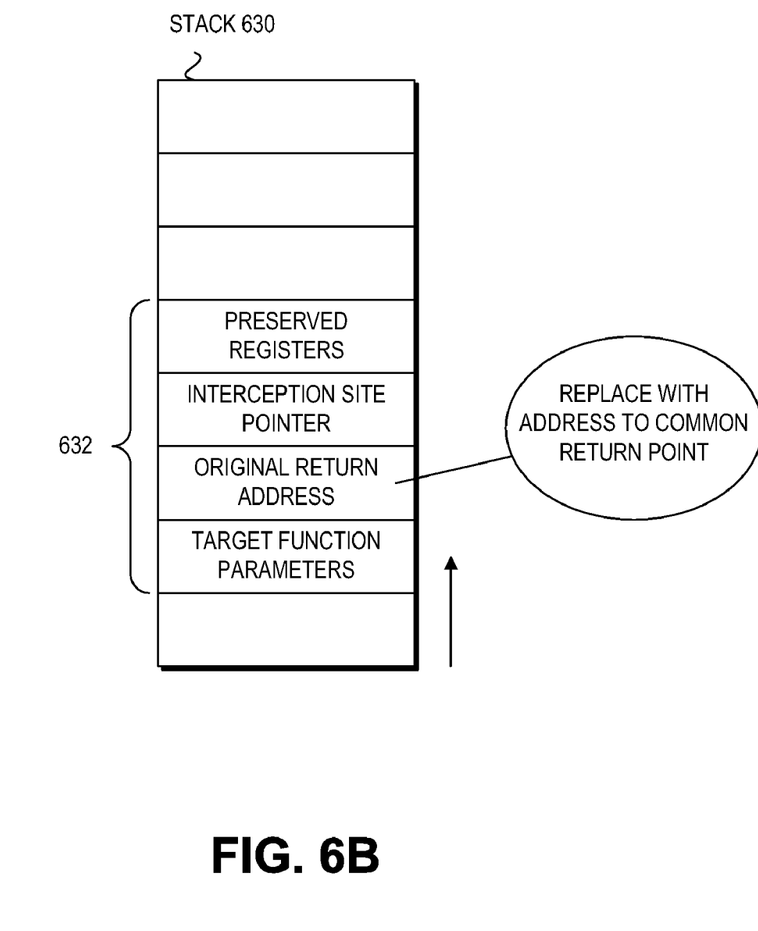
FIG. 6B is a block diagram of operations on a stack in accordance with an embodiment of the invention.

Referring to FIG. 6B, a stack 630 is shown having a common entry point stack frame 632. Stack 630 is shown as growing upward. It will be appreciated that stack 630 may also be viewed alternatively as growing down. As is conventional, when the target function was called, target function parameters were pushed onto stack 630, and then an original return address was pushed onto stack 630. Target function parameters may also have been passed using registers. As discussed above, the preserved registers have been pushed onto the stack by the context stub.

Returning to block 602 of FIG. 6A, stack-based target function parameters are available as offsets down the stack from the interception site pointer. Register based target function parameter values are available as offsets up the stack from the interception site pointer. The interception site pointer on the stack serves as a reference point for common entry point 210 to look up and down the stack for register-based and stack-based parameter values.

The logic of block 602 may retrieve target function interception site information as desired from the interception site. Common entry point 210 has easy access to the interception site since the interception site pointer was passed to common entry point 210.

Figure 9:
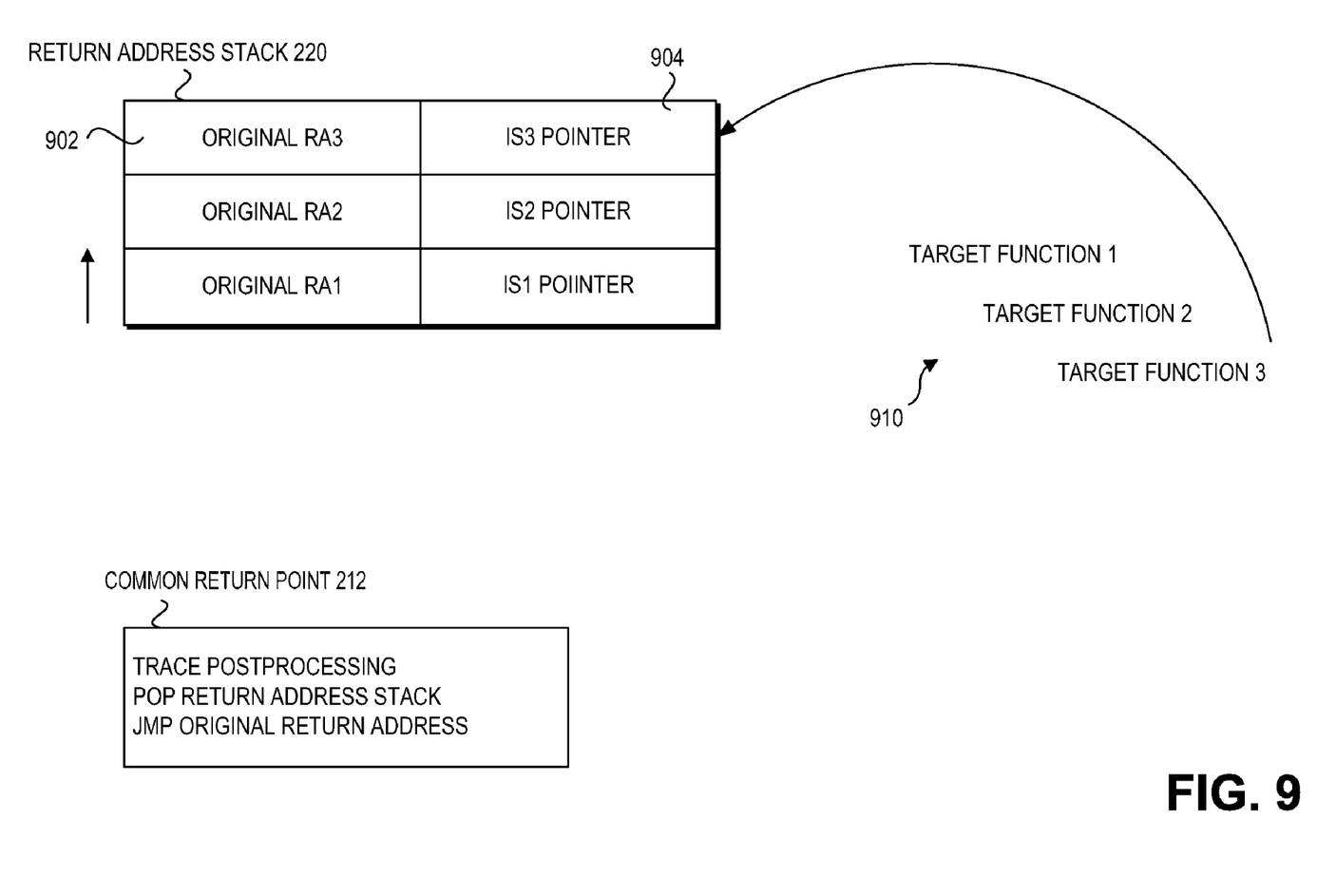
FIG. 9 is a block diagram of a return address stack and a common return point in accordance with an embodiment of the invention.

After block 602, the logic continues to block 604 to push the target function original return address and the interception site pointer on return address stack 220. An embodiment of return address stack 220 is shown in FIG. 9 and will be discussed further below.

Continuing to block 606, the target function original return address in the stack is replaced with an address for common return point 212. Thus, when a return from a target function is executed, the return will look to the stack, as is conventional, for the return address. However, since the original return address has been replaced, the execution flow will go to common return point 212 instead of the original return address.

Figure 7A:
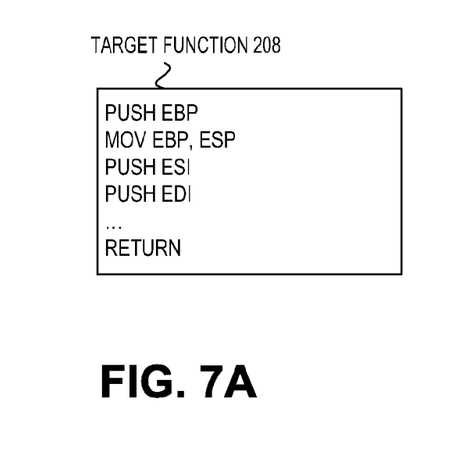
FIG. 7A shows a target function before instrumentation in accordance with an embodiment of the invention.
Figure 7B:
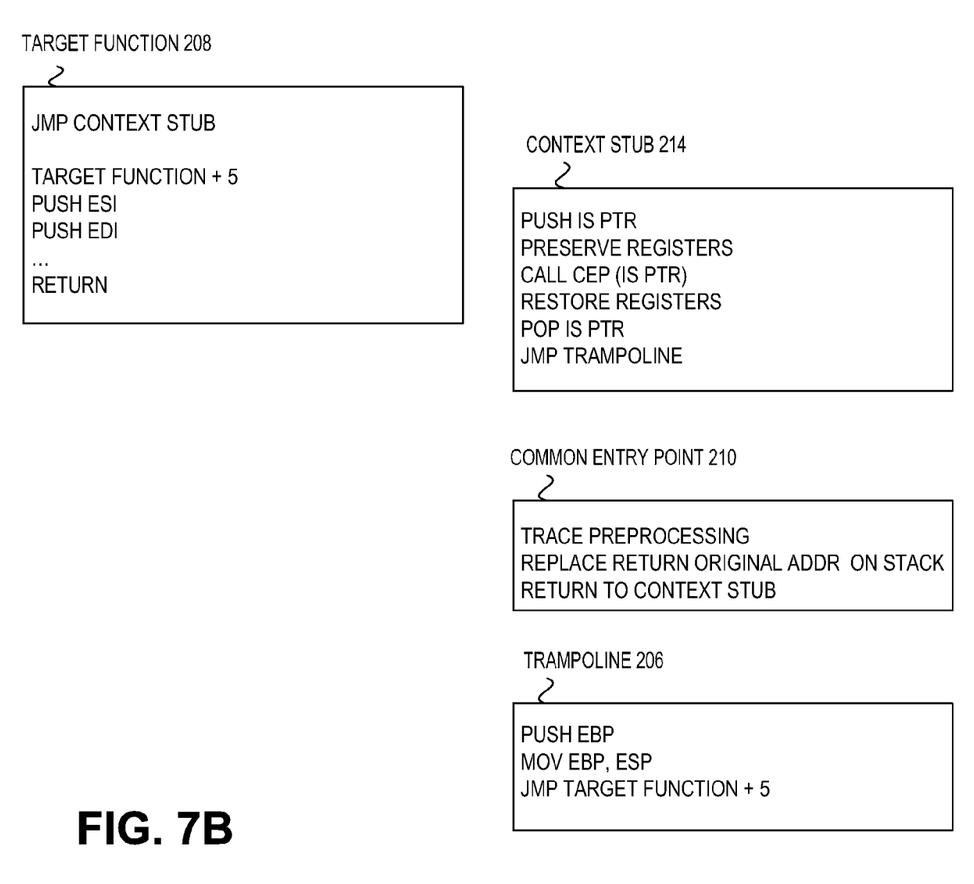
FIG. 7B shows a target function after instrumentation in accordance with an embodiment of the invention.

Turning to FIGS. 7A and 7B, an example of arbitrary call function tracing is shown. FIG. 7A shows target function 208 without instrumentation. Example target function 208 shows example Win32 binary code. The bottom of target function 208 in FIG. 7A includes a return of the target function (shown as RETURN).

FIG. 7B shows target function 208 after instrumentation as described herein. As shown, the first two lines of target function 208 have been replaced with an unconditional jump to context stub 214 created by IM 204. Context stub 214 performs operations discussed above and then calls common entry point 210 with the interception site pointer (IS PTR) passed as a parameter to common entry point 210.

Common entry point 210 performs trace preprocessing. Then, the original return address of target function 208 on the stack is modified to point to common return point 212. Common entry point 210 then returns to context stub 214.

Context stub restores the registers, cleans up the stack, and then jumps to trampoline 206. Trampoline 206 includes the first two lines of target function 208 that were replaced (compare to target function 208 in FIG. 7A). The end of trampoline 206 has an unconditional jump to the remaining code of target function 208 (shown as TARGET FUNCTION+5).

Figure 8:
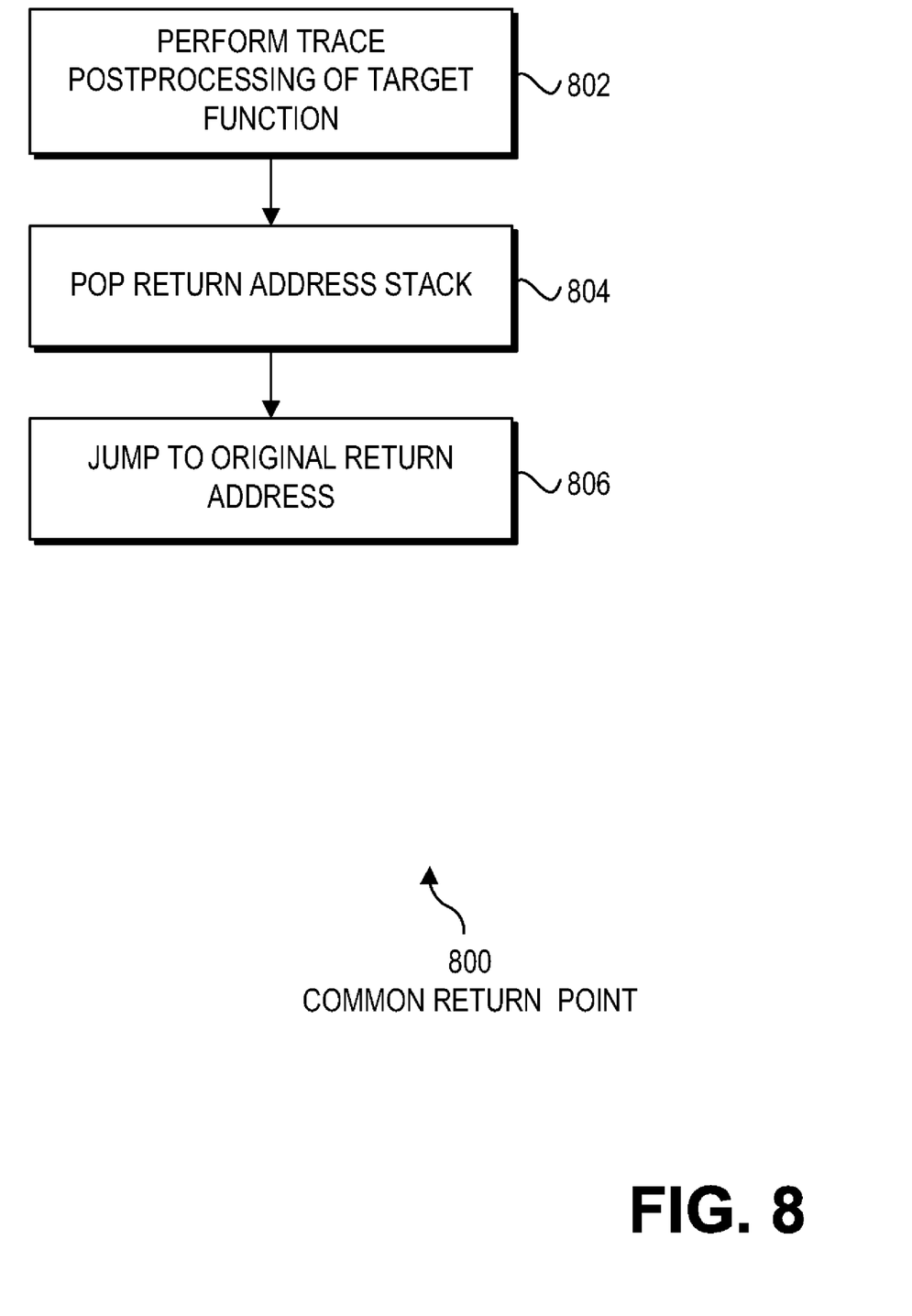
FIG. 8 is a flowchart showing the logic and operations of a common return point in accordance with an embodiment of the invention.

Turning to FIG. 8, a flowchart 800 shows an embodiment of the logic and operations of common return point 212. Starting in block 802, trace postprocessing of the target function is performed, if desired. The interception site pointer is available on return address stack 220 and used for trace postprocessing. It will be appreciated that a single function, common return point 212, may provide trace postprocessing instead of a developer having to provide trace postprocessing code for each target function.

Continuing to block 804, the top entry of the return address stack is popped. The logic then proceeds to block 806 to jump to the original return address. In one embodiment, the original return address is obtained from return address stack 220.

Turning to FIG. 9, an embodiment of return address stack 220 is shown. Return address stack 220 may be used to manage target function returns. Each stack entry includes the original return address of the target function, such as shown at 902, and the interception site pointer for the target function, such as shown at 904. As discussed above in connection with block 604 of FIG. 6A, whenever a target function is called, common entry point 210 places a new entry on return address stack 220.

As an example, nested target functions 1, 2, and 3 are shown at 910. It will be appreciated that functions not targeting for instrumentation may be interleaved within the nested target functions 910 during execution. The returns of such non-target functions are not tracked by return address stack 220.

In the example of FIG. 9, return address stack 220 has three entries corresponding to target functions 1, 2, 3. Target function 3 is the most recent target function in execution, so its original return address (ORIGINAL RA3) and interception site pointer (IS3 POINTER) are at the top of RAS 220. When target function 3 returns, the execution is diverted to common return point 212. Common return point 212 performs trace postprocessing. Then, the top of return address stack 220 is popped and common return point 212 jumps to the original return address (shown as ORIGINAL RA3).

If target function 3 is called again, then its original return address and interception site pointer would be pushed on RAS 220 again. Thus, RAS 220 grows and shrinks to track the original return addresses as target functions are called and returned.

Embodiments of the invention provide function call tracing at runtime. Embodiments herein determine target function information, such as call signature, of a target function at runtime. Thus, tracing code may perform monitoring without any prior knowledge of the functions that are to be traced. The tracing code can be created without knowing the signatures of any of the functions it will intercept. Instead, the required target function information is loaded dynamically at runtime. This allows tracing of functions that didn't even exist when the tracing code was created. Any number of functions with any arbitrary call signature may be intercepted by instrumentation manager 204 and handled by common code, such as common entry point 210 and common return point 212.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method comprising:
   identifying a first target function and a second target function;
   applying first instrumentation to the first target function during runtime of the first target function, wherein the applying first instrumentation comprises:
   determining first target function information comprising a call signature of the first target function;
   and placing the first target function information comprising the call signature of the first target function in a first interception site;
   applying second instrumentation to the second target function during runtime of the second target function, wherein the applying second instrumentation comprises:
   determining second target function information comprising a call signature of the second target function;
   and placing the second target function information comprising the call signature of the second target function in a second interception site;
   executing the first target function, wherein executing the first target function comprises first trace preprocessing of the first target function;
   and executing the second target function, wherein executing the second target function comprises second trace preprocessing of the second target function,
   wherein the first trace preprocessing and the second trace preprocessing are both executed by a single tracing function configured to use the call signature of the first target function in the first interception site to log register values or stack values of the first target function, and to use the call signature of the second target function in the second interception site to log register values or stack values of the second target function.

2. The method of claim 1 wherein identifying the first target function is performed during runtime of the first target function, and includes identifying the first target function in a library loaded in accordance with a collection profile.

3. The method of claim 1 wherein the applying first instrumentation further comprises:
   allocating the first interception site in memory to store the call signature of the first target function.

4. The method of claim 1 wherein the register values or the stack values of the first target function comprise parameters of the first target function.

5. The method of claim 1, further comprising replacing an original return address of the first target function and an original return address of the second target function on a stack with a common return point address.

6. The method of claim 1, further comprising accessing a return address stack to determine an original return address of the first target function.

7. The method of claim 1, further comprising accessing a return address stack to access the first target function information.

8. One or more computer readable storage devices including computer readable instructions that, when executed by one or more processors, cause the one or more processors to perform the method of claim 1.

9. One or more computer readable storage devices comprising computer readable instructions that, when executed by one or more processors, cause the one or more processors to perform:

identifying target functions in a library during runtime of a program associated with the library;

determining call signatures of the target functions during the runtime of the program, at least two of the target functions having different call signatures;

receiving, by a common detour function, the different call signatures of the at least two of the target functions;

and logging, by the common detour function, register-based parameters or stack-based parameters of the at least two of the target functions using the different call signatures to enumerate through the register-based parameters or the stack-based parameters of the at least two of the target functions.

10. The one or more computer readable storage devices of claim 9, further comprising computer-readable instructions that, when executed by the one or more processors, cause the one or more processors to perform:

allocating interception sites in memory to store the different call signatures for the at least two of the target functions;

and placing the different call signatures in the interception sites for the at least two of the target functions.

11. The one or more computer readable storage devices of claim 10, further comprising computer-readable instructions that, when executed by the one or more processors, cause the one or more processors to perform:

generating context stubs for the at least two of the target functions during the runtime of the program, the context stubs being configured to call the common detour function to perform trace preprocessing of the at least two of the target functions, including the logging of the register-based parameters or the stack-based parameters, wherein interception site pointers to the interception sites for the at least two of the target functions are passed to the common detour function.

12. The one or more computer readable storage devices of claim 11, further comprising computer-readable instructions that, when executed by the one or more processors, cause the one or more processors to perform:

replacing at least one instruction of a first one of the at least two of the target functions with a jump to the context stub for the first target function upon execution of the first target function;

and generating a trampoline function, wherein the trampoline function includes the replaced at least one instruction of the first target function and a jump to an unmodified portion of the first target function.

13. The one or more computer readable storage devices of claim 10 wherein the different call signatures are stored in the interception sites in a metainfo data format.

14. A system comprising:

an instrumentation manager module configured to determine target function information associated with at least two target functions in a library when the library is loaded during runtime, wherein the target function information includes call signatures of the at least two target functions;

a common entry point module configured to perform trace preprocessing, including logging register values or stack values of the at least two target functions, using the call signatures of the at least two target functions determined during runtime to discover the register values or the stack of the at least two target functions;

a common return point module to perform trace postprocessing of the at least two target functions using the target function information determined during runtime for the at least two target functions;

and one or more processors configured to execute at least one of the instrumentation manager module, the common entry point module, or the common return point module.

15. The system of claim 14, wherein the instrumentation manager module is configured to generate context stubs for the at least two target functions during runtime, wherein the context stubs are configured to push the register values of the at least two target functions on a stack for access by the common entry point module.

16. The system of claim 15, wherein the context stubs are configured to pop the register values from the stack after the common entry point module has executed.

17. The system of claim 14, wherein the common entry point module is configured to replace target function original return addresses of the at least two target functions on a stack with a common return point module address of the common return point module.

18. The system of claim 17, wherein the common return point module is configured to access a return address stack to determine original return addresses of the at least two target functions.

* * * * *